(12) United States Patent
Traub et al.

(10) Patent No.: US 8,527,539 B2
(45) Date of Patent: Sep. 3, 2013

(54) SYSTEM AND METHOD FOR A CENTRAL INDEX FOR RFID DATA WITH DATA PRIVILEGE INDICIA

(75) Inventors: Kenneth R. Traub, Lexington, MA (US); Emani Sanjay Sarma, Belmont, MA (US)

(73) Assignee: Oracle International Corporation, Redwood Shores, CA (US)

(*) Notice: Subject to any disclaimer, the term of this patent is extended or adjusted under 35 U.S.C. 154(b) by 1028 days.

(21) Appl. No.: 12/018,685

(22) Filed: Jan. 23, 2008

(65) Prior Publication Data

US 2008/0189287 A1 Aug. 7, 2008

Related U.S. Application Data

(60) Provisional application No. 60/886,467, filed on Jan. 24, 2007.

(51) Int. Cl.
*G06F 17/30* (2006.01)
(52) U.S. Cl.
USPC .......................................................... 707/781
(58) Field of Classification Search
None
See application file for complete search history.

(56) References Cited

U.S. PATENT DOCUMENTS

| 2002/0048369 A1* | 4/2002 | Ginter et al. ................... 380/277 |
| 2004/0073485 A1* | 4/2004 | Liu et al. ........................... 705/14 |
| 2004/0233040 A1* | 11/2004 | Lane et al. ..................... 340/5.86 |
| 2005/0149414 A1* | 7/2005 | Schrodt et al. .................. 705/29 |
| 2006/0108411 A1* | 5/2006 | Macurek et al. .............. 235/375 |
| 2006/0237547 A1* | 10/2006 | Barenburg et al. ............ 235/494 |
| 2006/0277061 A1* | 12/2006 | Revanur et al. .................... 705/1 |
| 2007/0055586 A1* | 3/2007 | Lucas ............................. 705/28 |
| 2007/0156281 A1* | 7/2007 | Leung et al. .................. 700/225 |
| 2008/0120725 A1* | 5/2008 | Asher et al. ..................... 726/27 |
| 2008/0157927 A1* | 7/2008 | Soppera et al. .............. 340/10.1 |
| 2008/0157933 A1* | 7/2008 | Winkler ....................... 340/10.6 |

OTHER PUBLICATIONS

VeriSign. VeriSign EPC Network Services—EPC Information Services Implementation Guide, Version 1.5. Aug. 2004.*
Traub et al. The EPCglobal Architecture Framework. EPCglobal Final Version of Jul. 1, 2005. http://www.epcglobalinc.org/standards/architecture/architecture_1_0-framework-20050701.pdf.*
VeriSign. EPC Network Architecture. 2004. http://interval.hu-berlin.de/downloads/rfid/IT_Infrastruktur/013343.pdf.*
Konidala et al. Security Assessment of EPCglobal Architecture Framework. Auto-ID Labs White Paper WP-SWNET-017. 2006.*

* cited by examiner

*Primary Examiner* — Syed Hasan
(74) *Attorney, Agent, or Firm* — Fliesler Meyer LLP

(57) ABSTRACT

In one embodiment, a central data repository stores product code information. The central data repository can receive permissions from providers of the produce code information. The permissions can indicate whether the product code information can be provided to a third party.

16 Claims, 8 Drawing Sheets

SYSTEM AND METHOD FOR A CENTRAL INDEX FOR RFID DATA WITH DATA PRIVILEGE INDICIA

CLAIM OF PRIORITY

This application claims priority to U.S. Provisional Application No. 60/886,467 entitled "SYSTEM AND METHOD FOR A CENTRAL INDEX FOR RFID DATA WITH DATA PRIVILEGE INDICIA", filed Jan. 24, 2007, which is herein incorporated by reference.

BACKGROUND OF INVENTION

Product code information, such as Electronic Product Codes (EPC) or Electronic Product Code Information Service (EPCIS) event data, can be used to track products through a supply chain. RFID data including the product code information can be obtained and the product code information sent to a repository, such as an EPCIS repository.

DETAILED DESCRIPTION

Figure 1:
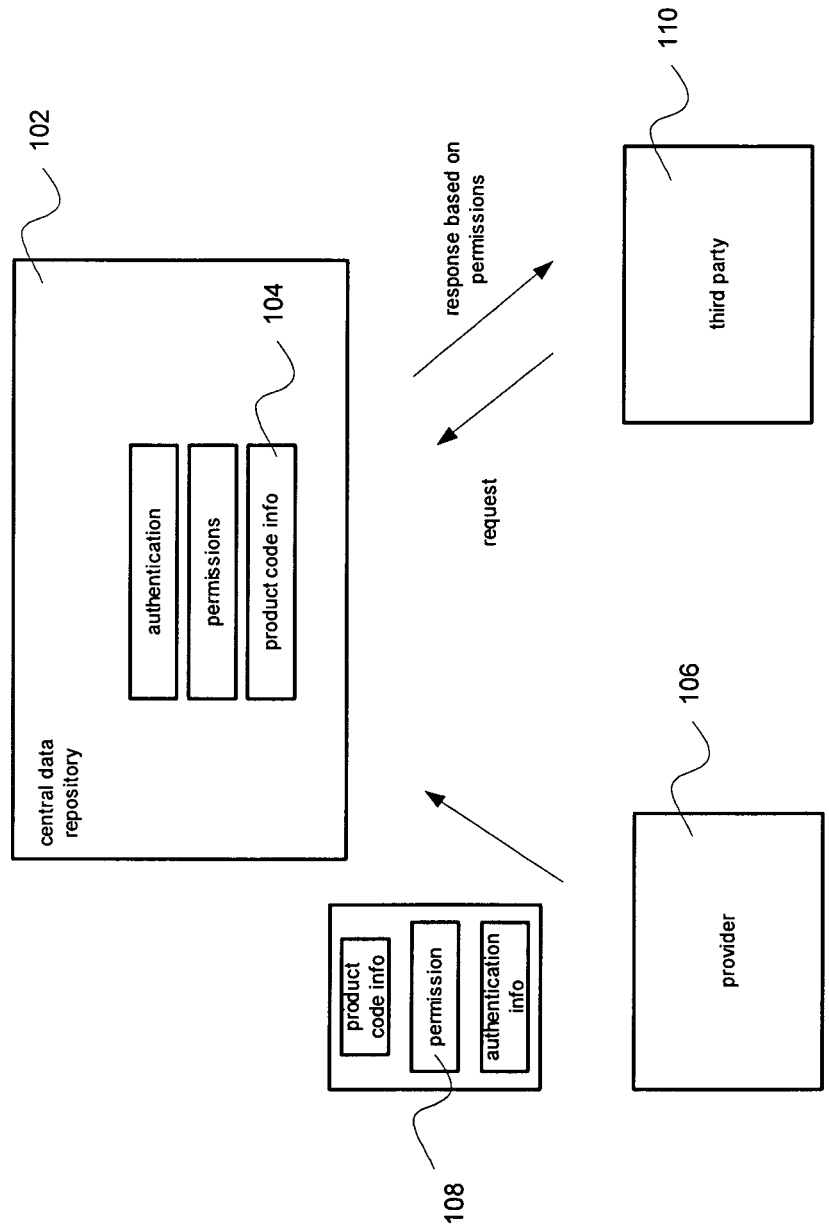
FIG. 1 is a diagram of a central data repository of one embodiment.

A difficulty occurs in controlling access to the product code information for multi-party transactions. A single repository that holds product code information produced by all parties is impractical, both because of the quantity of data and because each party may want to retain greater control over access to its data. Therefore, each party may retain product code it generates in its own data repository, and provide a query interface through which other parties may obtain the first party's product code information. Each such party may be termed a product code data provider.

A distributed system as described above, in which one party must query other parties to obtain all relevant data in a multi-party transaction, leads to two new difficulties. First, the party that wants to obtain information must somehow discover the identities of the product code data providers who may have data. Second, the first party must prove to each product code data provider that it is entitled to gain access to the data. This is difficult because in some cases the party requesting data access may not have a pre-existing business relationship with the party possessing the data, if these parties are two or more steps separated from each other in the supply chain.

To help solve these problems a central data repository that stores index information received from all parties may be provided. An example of index information is a tuple that associates a specific product code with the identity of a supply chain party who acts as a product code data provider for that product code. When one party wishes to obtain all data for a given product code, the party issues a query to the central data repository, which uses the index information to respond with the identities of all product code data providers who have product code information pertaining to that product code. The first party can then query each of those product code data providers individually to retrieve the desired data. This approach is similar to the way Internet search engines such as Google work, with the search engine corresponding to the central data repository, individual web sites corresponding to the product code data providers, and uniform resource locators corresponding to the index information.

Internet search engines do not completely address the difficulties noted above. First, index information itself may be privileged, and so the central data repository must share index information only with authorized parties. (In contract, Internet search engines commonly share all data with all requesting parties, without regard to authorization.) Second, the difficulty noted above still exists wherein one party must prove to a product code data provider that it is entitled to receive information, even though there may be no prior business relationship.

The present invention solves these problems by using permission information to control access to index information. The permission information may also be used by one party to help prove to a product code data provider that the first party is entitled to receive product code information from the product code data provider, even if no prior business relationship exists.

Figure 5:
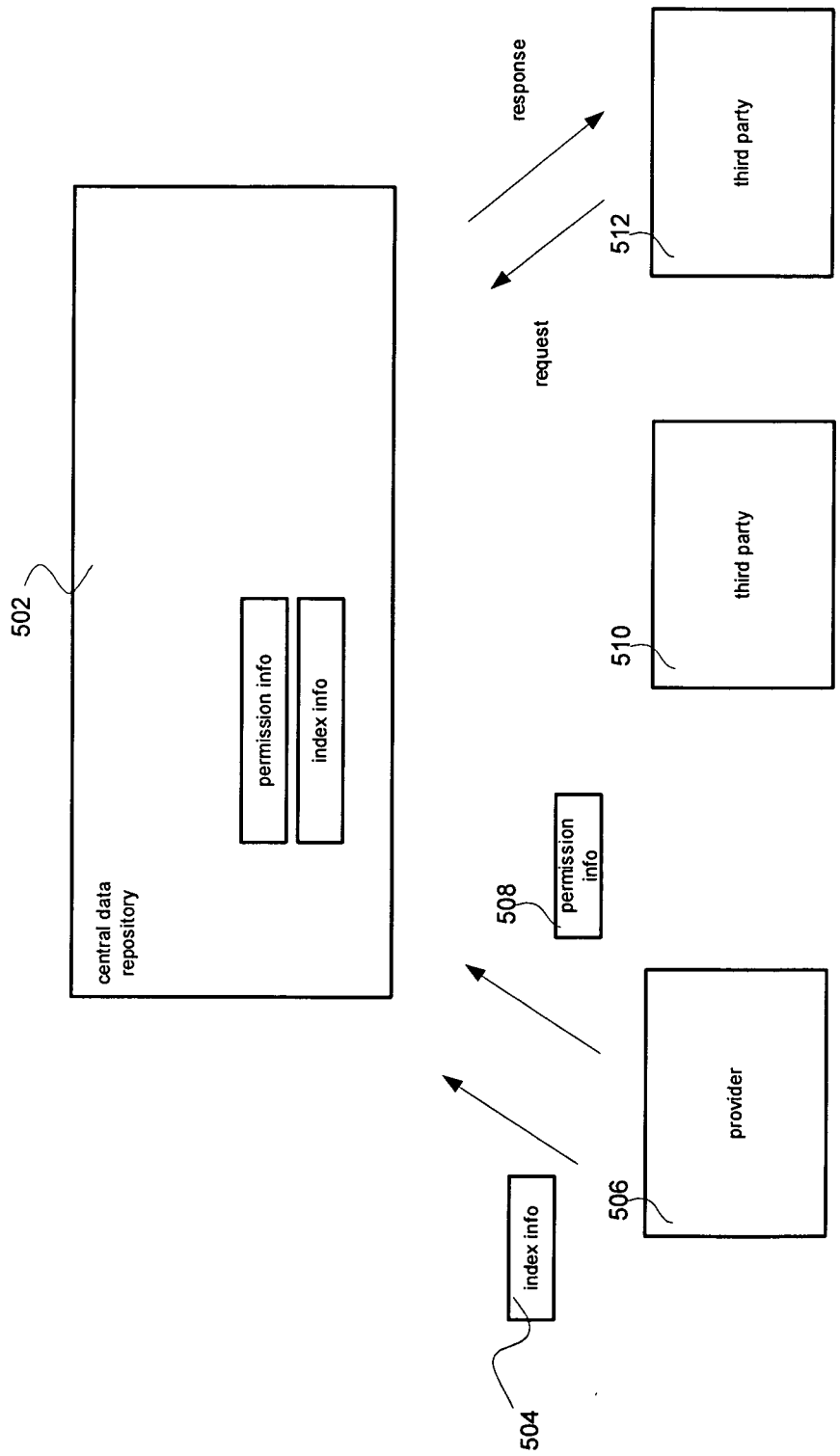
FIG. 5 is a diagram of one embodiment.

FIG. 5 shows an example of one embodiment. A central data repository 502 can store product code index information 504. The central data repository, such as repository 502, can receive product code index information from product code data providers, such as provider 506.

The index information may indicate that provider 506 has product code information about a particular product code. The product code may be an electronic product code. The product code information can be information related to electronic product code, such as EPCIS event information. The product code information can be derived from RFID data.

The central data repository 502 can receive permission information 508 from a product code data provider, such as provider 506. The permission information can indicate whether the product code information can be provided to a third party 510.

Another third party 512 can make a request to the central data repository to discover the identities of product code data providers that have information about product codes of interest. The central data repository can respond with index information 504 previously received, indicating the identities of product code data providers that have data. The central data repository can limit its response based on previously received permission information 508, such that the requesting party 512 only receives index information that it is authorized to receive. Authorization may be granted because permission information 508 directly indicates that a product code data provider such as provider 506 explicitly granted permission to the requesting party 512. Authorization may also be granted because the net effect of several permissions received from several data providers is to grant permission to requesting party 512. The central data repository can include in its response to requesting party 512 all of the relevant permission information that it used to authorize the delivery of the index information.

Having received product code index information and accompanying permission information, the third party 512 can then issue a request directly to a product code data provider, such as provider 506, to retrieve product code data. The third party 512 may provide to product code data provider 506 permission information received from the central data repository 502. The product code data provider 506 may use this permission information to authenticate the identity of third party 512 and determine whether third party 512 is authorized to receive the product code data it requests. If authorized, the provider 506 may respond to third party 512 with the desired product code information.

Figure 6:
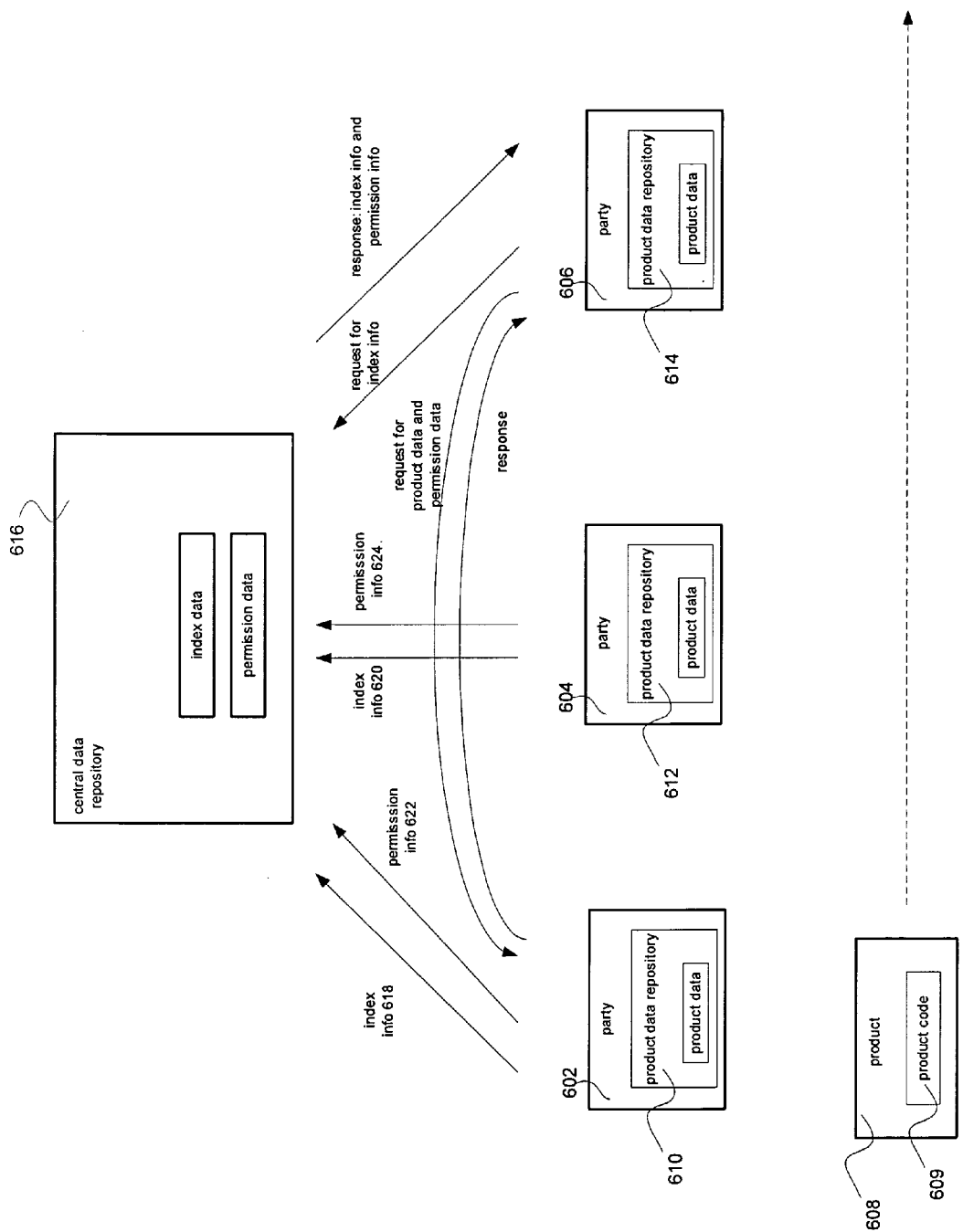
FIG. 6 is a diagram of an example with three parties in a supply chain.

FIG. 6 shows an example where there are three parties in the supply chain, the parties labeled 602, 604, and 606 in the figure. A product 608 identified by product code 609 is shipped from party 602 to party 604, and later is shipped from party 604 to party 606. Party 602 gathers product code data while the product is in its possession, and stores the product code data in its repository 610. Party 604 gathers product code data while the product is in its possession, and stores the product code data in its repository 612. Party 606 gathers product code data while the product is in its possession, and stores the product code data in its repository 614.

Party 602 sends index information 618 to a central data repository 616, where index information 618 indicates that party 602 has product code data pertaining to product code 609. Party 604 likewise sends index information 620 to the central data repository 616, where index information 620 indicates that party 604 has product code data pertaining to product code 609.

Party 602 also sends permission information 622 to the central data repository 616, where permission information 622 indicates that party 602 will share data about product code 609 with party 604 and any other party that party 604 designates. An example of such permission is the WillShare-Many permission discussed in the exemplary embodiment below. Likewise, party 604 also sends permission information 624 to the central data repository 616, where permission information 624 indicates that party 604 will share data about product code 609 with party 606 and any other party that party 606 designates.

Party 606 sends a request to the central data repository 616, asking for product code index information pertaining to product code 609. The central data repository 616 uses permission information 624 to conclude that index information 620 may be shared with party 606. The central data repository 616 uses permission information 622 and permission information 624 in combination to conclude that index information 618 may be shared with party 606. The central data repository 616 then responds to Party 606 by providing index information 618, index information 620, permission information 622, and permission information 624.

Party 606 may then use index information 618 to discover that party 602 is a product code data provider for product code 609. Party 606 may send a request to party 602 requesting product code data pertaining to product code 609. Party 606 includes permission information 622 and permission information 624 in its request. Party 602 may use the permission information to authenticate the identity of party 606 and to determine that party 606 is authorized to receive data pertaining to product code 609. Party 602 may then respond to party 606 with product code data pertaining to product code 609.

In this example, if any party other than party 602, party 604, or party 606 requests index data or product code data pertaining to product code 609, the request will be denied because the permission information 622 and 624 does not authorize access to any other parties.

FIG. 1 shows an example of one embodiment. A central data repository 102 can store product code information 104. The central data repository, such as repository 102, can receive permissions from providers of the product code information, such as provider 106. The permissions can indicate whether the product code information can be provided to a third party 110.

The product code information can be related to electronic product codes, such as EPCIS event information. The product code information can be derived from RFID data.

The central data repository 102 can authenticate the provider 106 and third parties 110. This can be done based on authentication info sent to the central data repository 102. The central data repository can also control the discovery of the existence of the product code information using the permissions as well.

Figure 2:
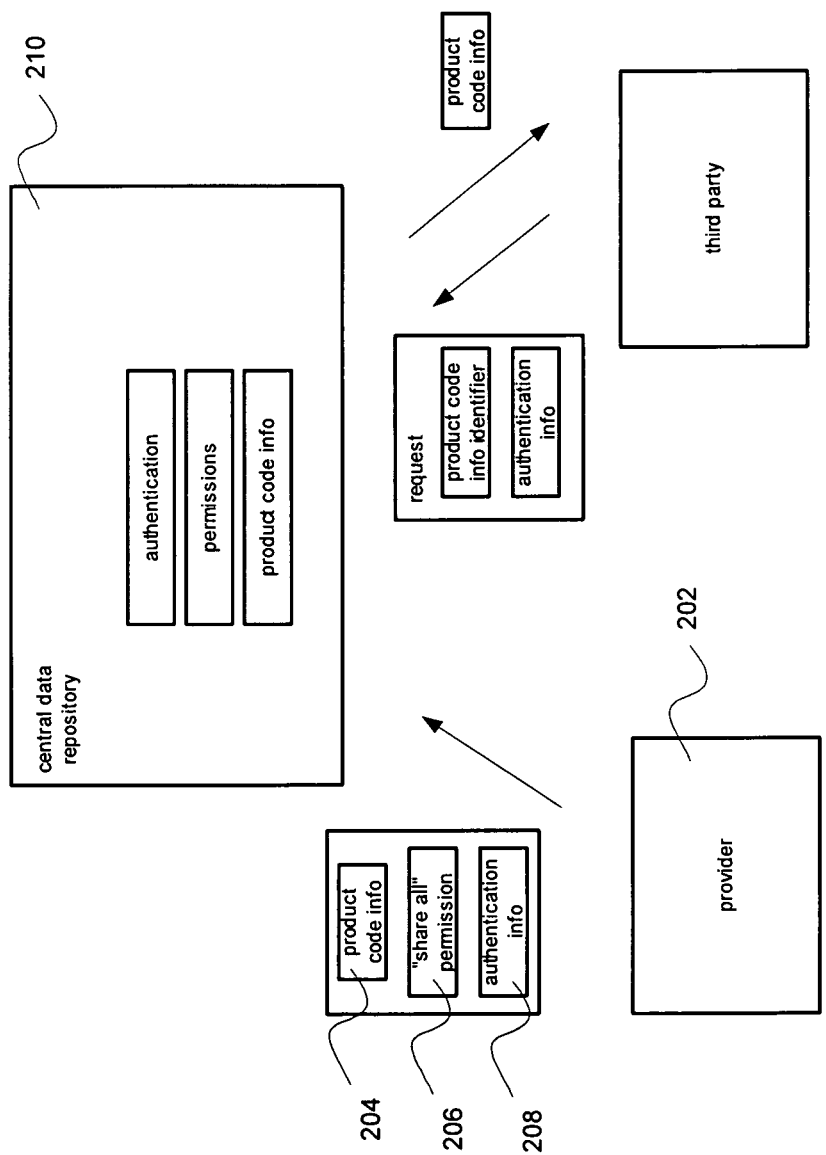
FIGS. 2-4 are diagrams of a central data repository that uses different types of permissions.

FIG. 2 shows a case where the permissions include "share with all" permission. An example of such permission is the WillShareAll permission discussed in the exemplary embodiment below.

In the example of FIG. 2, provider 202 sends product code info 204, the permission "share with all" 206 and authentication info 208 to the central data repository 210. The central data repository 210 can then send the product code info to any third party, such as third party 212.

Figure 3:
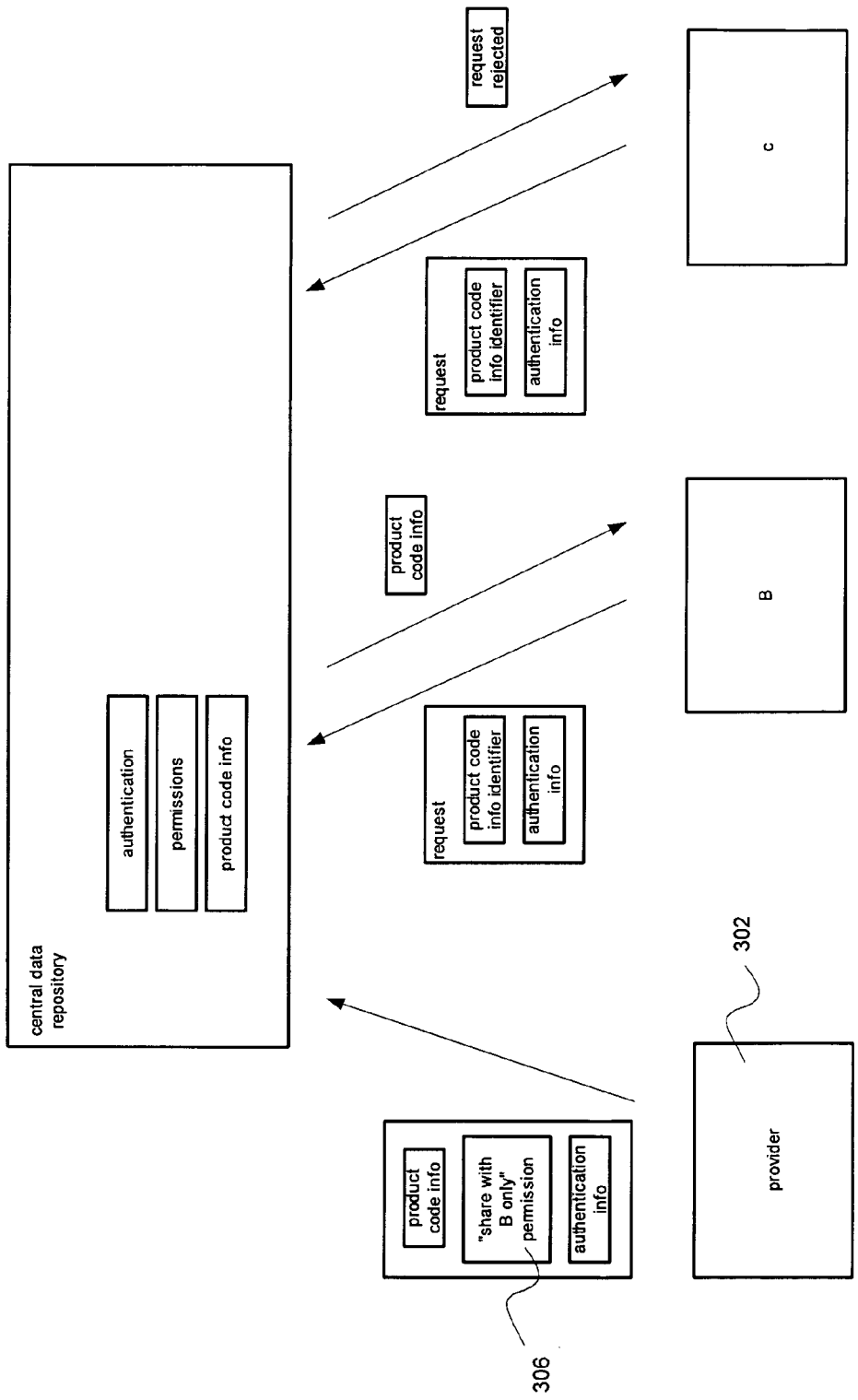

FIG. 3 shows a case where the permissions include "share with a specific third party only" permission. An example of such permission is the WillShare permission discussed in the exemplary embodiment below.

In the example of FIG. 3, product 302 sends "share only with B" permission 306 to the central data repository. In this case, B can access the product code info, but C can not.

FIG. 3 shows a case where the permissions include "share with third party and with those that the third party designates" permission. An example of such permission is the WillShare-Many permission discussed in the exemplary embodiment below.

Figure 4:
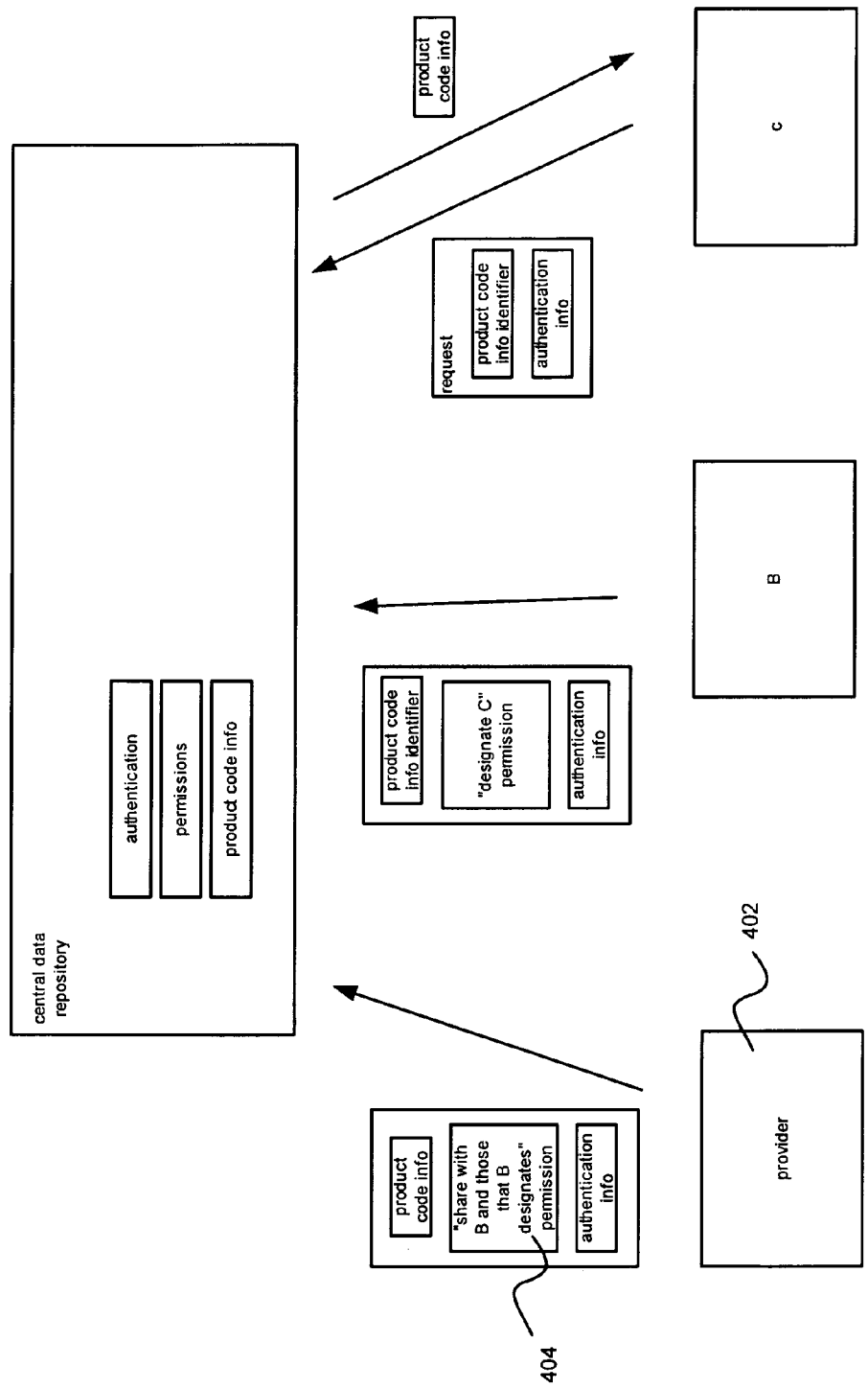

In the example of FIG. 4, provider 402 sends "share with B and anyone they designate" permission 404. B then can send a "designate C" permission to allow C to access the product code information. Other rules or permissions can be used to restrict the chaining in certain ways.

EXEMPLARY DESCRIPTION OF AN EXAMPLE EMBODIMENT

An exemplary embodiment of system using methods of the present invention is described below. The following exemplary embodiment is not meant to be limiting as to terms, definitions and the like. For example, language in this section is not intended to limit or define the claim terms but only to describe how the components work in the particular exemplary embodiment. This section merely describes one exemplary way to implement the present invention. Other architectures implementing the methods of the present invention can be done.

This section considers the problem of how product code data, such as the Electronic Product Code (EPC) related data, is to be shared among multiple participants in a global supply chain. The example given below describes a system using EPC data but it is to be understood that other types of product code data including other product codes derived from RFID data can be used as well.

Figure 7:
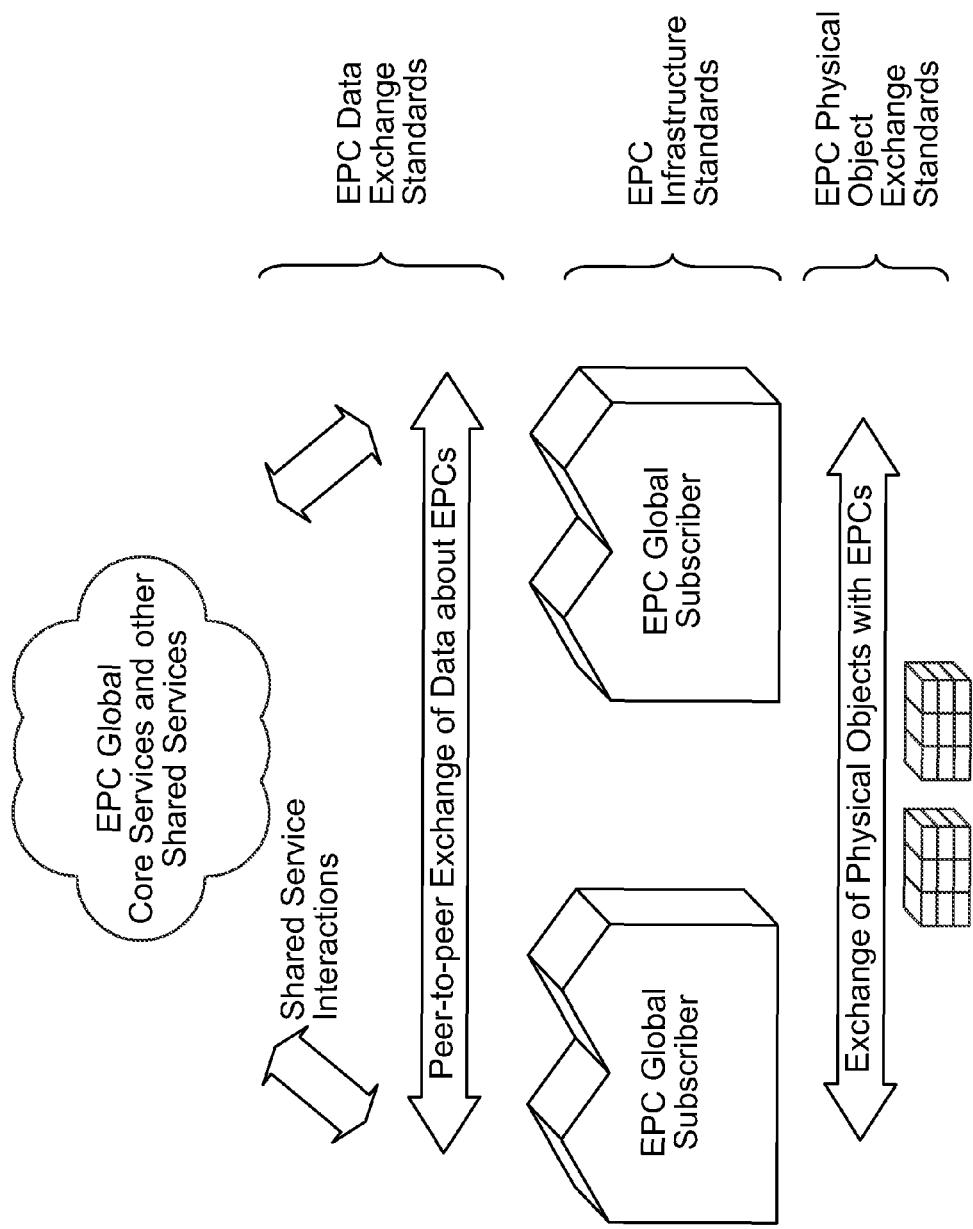
FIG. 7 is a diagram of an EPC global network.

The work of the EPCglobal business and technical communities to date have laid a solid foundation for exchange of EPC data, including the definition of the Electronic Product Code (EPC) standard, the EPC Information Services (EPCIS) standard, and others. The most general problem of data exchange in a multi-party supply chain setting, however, is not fully addressed by the existing standards or architecture documents. The purpose of this document is to describe the data exchange problem, and propose an outline for breaking this problem into its component parts The EPCglobal Network is a community of trading partners engaged in the capture, sharing, and discovery of EPC related data using standard interfaces. The EPC Network enables companies to track goods using EPC tags, and to securely exchange information over the network in FIG. 7.

This document focuses on the highest layer in this "stack," titled "EPC Data Exchange Standards."

The functional requirements of the "EPC Data Exchange" layer are the most open-ended portion of the EPC Network System. There are several reasons. First, the application space itself is large and growing rapidly. For example, while much attention has recently been devoted to the Consumer Packaged Goods (CPG/) retail supply chain, new and large industries like aerospace and automotive are only beginning to adopt the EPC. The use-cases that the EPC Network must serve are expanding with this burgeoning adoption. Second, within any space, the functions that the EPC Network is being put to work on are also changing rapidly. For example, while the EPC Network was always expected to serve large CPG suppliers and retailers, a number of smaller entities are beginning to use EPC tags to communicate with each other in a more freeform way. While, in many ways, the EPC Network must always adapt to changing requirements and will always remain a work in progress, the EPC Data Exchange Standards will help companies to make investments that enable trading partners to interoperate and to take advantage of current and future EPC capabilities. The EPCglobal Network standards describe a suite of interfaces that allows trading partners to selectively choose their deployment model based on company/industry needs. The EPCglobal network will evolve into a highly distributed information sharing model.

There have been many formal and informal questions in EPCglobal and other communities about the discovery of assets in a supply chain. The word "discovery" has been used in many contexts. It is useful to identify the contexts, and to clarify exactly what problem is being referred to.

A Taxonomy of Data Exchange Problems

In any data exchange scenario, there is one party (the "Initiator") who is initiating the exchange with respect to a particular EPC, and one or more other parties that have had contact with that EPC and therefore are the parties with whom the Initiator wants to communicate. The general data exchange problem is multi-dimensional in its complexity. In theory, there are several ways in which to classify the actions and modes of the data-exchange interaction between the initiator and other parties. We list two below:

Does the initiator want to retrieve information about an EPC from knowledgeable parties, or does the initiator want to post information about that EPC to concerned parties?

Does the initiator want to exchange information about the past or the future?

Together these two pairs of options combine into four possible flavors of data exchange. We illustrate all four possibilities below:

|  | Past | Future |
| --- | --- | --- |
| Retrieve | The initiator could ask where has this EPC has been. Most track and trace tasks take this form. For example, the FDA might want to know: where was this product inserted into the supply chain, and has it passed through bona fide hands? Or the initiator might ask where the product is now. | The initiator could place a standing request for information (i.e., a subscription) for information about an EPC in the future. For example, the FDA might want to know the whereabouts of a narcotic product to ascertain whether it is within the regulated supply chain, or whether it has left the regulated supply chain. |
| Post | The initiator could post information about an EPC for concerned parties most likely to possess an EPC now. This information should reach the most recent party known to possess that EPC or perhaps all parties who ever possessed the EPC. For example, a recall notice might be sent to the party known to be most recently in possession of an EPC. Or, all parties which have been in possession of an EPC-tagged shipment might need to be informed of the subsequent discovery of a hazardous chemical which has leaked. | The initiator could post information about an EPC for the consideration of concerned parties in the future. For example, a standing recall notice for a product when it next appears in the EPC Network. Or, parties who receive a product in the future might need to be informed of updated handling requirements. |

Yet another set of variation on this problem may be obtained by replacing phrase "given a specific EPC" with "given a set of characteristics shared by one or more EPCs." For example, I might wish to obtain all data pertaining to Acme Widgets manufactured in the month of April 2005. The general space of data exchange problems, therefore, consists of eight different problems: the four defined in the table above, and variants of all four in which EPCs are identified by characteristics rather than their identities ("yellow pages" as compared to "white pages").

The word "discovery" has been applied somewhat ambiguously to different subsets of the problem set we have described. In some discussions, the term has been used to ask the question: where is a particular EPC now? In the parlance described above, this question might be restated as "I would like to retrieve the last known past location of a particular EPC." This question cannot be answered directly in multiparty supply chains given the current state of the EPC Network, and is a focus of this document. In other contexts, the question has been posed as "Given this EPC, where can I find some specific class of information about the object?" If the information being sought is some form of master data which would have been created at the time the EPC was commissioned, then the existing Object Name Service [ONS] would be the appropriate service to answer the question. In still other situations, the question being asked is: "Where can I find out about products with the following characteristics?" This question has the "yellow pages" flavor that we referred to in the previous paragraph. Given these ambiguities, we will assume the word "discovery" to mean any of the eight questions, and other possible unanticipated variations, described above.

The bulk of this paper focuses on the past-retrieval "white pages" problem; that is, given an EPC, how do I find all information pertaining to it that other parties have gathered in the past? Detailed consideration of this problem will expose most of the issues at the core of all eight variants. The other seven variants will be considered towards the end of this paper.

Fundamentals of Data Exchange: Two-party Example

To begin to understand the data exchange problem, consider the past-retrieval problem in a simple two-party supply chain.

Here are illustrated two trading partners: a manufacturer and a retailer. The manufacturer delivers goods to the retailer, and later wants to obtain observation information collected within the retailer's facilities. A real-world application of this scenario is in the retailing of promotional products, where the manufacturer can improve the success of the promotion by knowing exactly when promotional product is moved from the store room to the sales floor of the retail store.

Following a single product with a specific EPC, the sequence of events is as follows.

1. The manufacturer records EPCIS events as the product moves through its facilities. For example, an EPCIS event may be generated when the EPC is assigned to the product (commissioned), when the product leaves the factory, when the product arrives at the manufacturer's distribution center, and when the product leaves the manufacturer's distribution center. Each EPCIS event has four dimensions: what (the EPC), when (the time of the event), where (the location of the event), and why (the business context). The EPCIS events are recorded in a database maintained by the manufacturer.
2. The retailer records EPCIS events as the product moves through its facilities. For example, an EPCIS event may be generated when the product arrives at the retailer's distribution center, when the product leaves the retailer's distribution center, when the product arrives at the back room of the retail store, and when the product moves from the front room to the back room. The EPCIS events are recorded in a database maintained by the retailer.
3. Some time later, the manufacturer contacts the retailer, and requests any EPCIS events the retailer has regarding the specific EPC. The retailer considers the request, decides to allow it, and returns the events from its database. The manufacturer now has a complete set of data about the EPC in question.

This is a straightforward application of EPCIS, and is typical of what takes place today between retailers who have adopted EPC technology and their suppliers. While comparatively simple, this scenario illustrates the main ingredients in any data exchange scenario, as discussed in the following section.

The General Ingredients of Data Exchange

The description of Step 3 in the illustration above glossed over a number of important details that must be addressed in order to solve the general problem of data exchange. These are made explicit below.

The component parts of any solution to the past-retrieval problem may be described a set of questions to be answered, flowing from the general statement of the problem.

General problem #1 given an EPC, how do I obtain all data pertaining to that EPC that I am entitled to receive?
 1. Discovery—where is the data?
  1.1 At the time of the request, how do I (the "Receiver") learn the source identifiers for the data? (A "source identifier" is some handle that can be resolved into a channel for transferring data; e.g., a URL and an identification of a protocol to be used.)
  1.2 For each source identifier, whom do I contact (the "Sender") and what method or protocol do I use to establish a data transfer channel?
 2. Authentication/Trust
  2.1 How do the Sender and Receiver establish the conditions so that the results of authentication can be trusted?
  2.2 How do the Sender and Receiver mutually identify themselves, to provide necessary input to the entitlement decision?
 3. Entitlement—what data is shared?
  3.1 What rules are employed by the Sender to entitle the Receiver to data?
  3.2 Inputs to the entitlement decision
   3.2.1 What information must the Sender have in order to evaluate those rules? Three kinds of information may be involved: identity information about the Receiver (from #2), what data the Receiver is seeking (i.e., his query), and Other Information.
   3.2.2 In the case where Other Information plays a role in 3.2.1, how does the Sender obtain it?
 4. Exchange—What is the data transfer mechanism between Sender and Receiver, and what are the semantics of the data? For the past-retrieval problem, we can assume that the EPCIS specification provides the answer to this question.

The core concepts in this outline—Discovery, Authentication, Trust, Entitlement, and Exchange—are the technical problems to be solved in presenting a complete solution to the general data exchange problem. The remainder of this document explores these in depth, beginning with the two-party example and working towards more complex scenarios.

Analysis of the Two-Party Example

In the two-party example above, the Sender is the Retailer and the Receiver is the Manufacturer. The Discovery question (where does the Manufacturer find the data he needs) had a very simple answer; pre-arrangement. That is, the Manufacturer already knew that the Retailer was the place to go for the data, because the Manufacturer had delivered the products directly to the Retailer. The answer to the discovery question followed directly from the business relationship between the Manufacturer and Retailer. As we will see, the discovery question becomes much more complex in multi-party scenarios, and the business relationships continue to play an important role in understanding how discovery must work.

When the Manufacturer actually issued its query to the Retailer in Step 3, the Retailer had to authenticate the identity of the Manufacturer before responding to the request. The identity of the Manufacturer is important, because the Retailer is not willing to share its data with anybody who asks, only a party who is entitled to the data by virtue of the Retailer's own information sharing policy. Authentication itself can be accomplished by any of a number of well-established protocols. However, it is important to understand the Trust issues that make authentication meaningful, and so both Authentication and Trust will be discussed at length in a following section.

With Authentication accomplished, the Retailer is ready to decide how to respond to the Manufacturer's query. This requires the Retailer to make an Entitlement decision. The Entitlement decision is based on the Retailer's own data sharing policy. A plausible data sharing policy that might apply in the two-party example is this: "I (the retailer) am willing to share data about EPC X with Company Y if (a) Y has a current business relationship with me as a supplier, and (b) EPC X was shipped to me by Y as part of a legitimate business transaction." The identity of the receiver, as confirmed through Authentication, is clearly an input to this decision. So are other bits of business information, such as the current state of the business relationship and the records of past business transactions. The business rules can be quite complex—mirroring the complexity of real-world business relationships between companies.

Once the Retailer has made its Entitlement decision, it is ready to complete the Exchange step by delivering the appropriate EPCIS event records to the Manufacturer.

As will be shown below, the past-retrieval problem becomes considerably more complicated when three or more parties are involved. The answer to the Discovery question may include parties with whom the Receiver does not have a direct business relationship. In those situations, merely learning who has data may violate confidentiality covenants that other parties have with each other. This means that the Discovery question becomes entangled with Entitlement, and therefore with Authentication and Trust. This is explored fully below. But first, Authentication, Trust, and Entitlement will be explored in further detail.

More about Authentication, Trust, Entitlement.

This section elaborates on the concepts of Authentication, Trust, and Entitlement.

Authentication

Authentication is the process whereby one party verifies the identity of another party. Most methods of electronic authentication via a computer network rely on a secret key. Suppose Party A holds a secret key. If an initially unknown party contacts Party B, and provides convincing evidence to Party B that he holds A's secret key, then Party B can infer that the unknown party is in fact Party A.

An understanding of Trust is very important to the data exchange problem, and Trust can only be fully appreciated if certain aspects of Authentication are understood.

Consider Authentication based on X.509 public-key certificates. A certificate contains the public key of a public/private key pair; the private key is retained by the certificate owner and kept secret. The certificate also contains other information such as the owner's name, and this other information is integrity-protected from tampering through a digital signature.

A certificate can be used for two types of authentication. A digital signature of a document is created by creating a message digest of the document (a large number computed from the contents of the document in such a way that no other document is likely to have the same digest), and encrypting it using the private key. A recipient of the document can verify the signature by using the public key in the certificate to decrypt the message digest, and compare it to its own computation of the digest from the document contents. If this completes successfully, the recipient can infer that the document it received is the same document that was signed by the holder of the certificate. (This verifies not only the authenticity of the document, but also the identity of the signer.)

Certificates can also be used to authenticate a party in a network conversation, using a challenge-response protocol. Party B sends a random number (a "nonce") to Party A, who then encrypts it using his private key. Party B then decrypts the result using the public key in Party A's certificate. If this completes successfully, Party B can infer that the other party in the conversation is Party A. (A random number is used so that an eavesdropper cannot subsequently "replay" the information to trick Party B in a subsequent conversation.)

In both forms of Authentication, it is important to understand what the Authentication is really guaranteeing. The result of Authentication is that the identity of the other party is verified to be the holder of the certificate. But how does the first party know if the holder of the certificate is really the party he wants to interact with? For example, a Retailer may wish to authenticate a Manufacturer to verify that it is XYZ Corporation. Through the use of certificates, the Retailer can verify that a message was sent from the holder of a particular certificate, and that certificate may contain the string "XYZ Corporation" in the "company name" field. But how does the Retailer know that this is really the XYZ Corporation, with whom it has a supplier contract, and not some other company that is also named "XYZ Corporation," or some rogue entity that has created a certificate containing the name "XYZ Corporation"? "Trust" refers to the issues connected with answering this question.

Trust

Trust is the means by which the results of Authentication are given business meaning. Authentication verifies identity as embodied in a certificate or other cryptographic artifact, while Trust are the conditions that allow this narrow definition of identity to be extended to a business-related definition of identity, such as the party to a business contract.

A full discussion of Trust goes well beyond the scope of this paper. However, a few examples of how Trust may be achieved are discussed below, as they are relevant to the data exchange scenarios discussed later. To simplify the discussion, it is assumed that public-key certificates are used for Authentication, but the arguments apply equally to other means of Authentication.

Out-of-Band Certificate Exchange

Two companies can achieve trust by an out-of-band certificate exchange. For example, the CIOs of each company meet in a room, and exchange a pair of diskettes, each containing his company's certificate. They also sign a legal document in which each represents that the certificate delivered on that day is the authentic and true certificate for their company. The CIOs return to their headquarters, and record the certificate they received as being the official certificate of the other company. Now, if Company B can authenticate Company A using the certificate it received from A during the key exchange ceremony, Company B can trust that the other party is indeed Company A.

Here, the trust is established through an out-of-band (that is, separate from any computer exchange) means, namely the fact that the CIOs recognize each other when they meet and have backed up their word with a contract. Note that when B authenticates A, the content of A's certificate doesn't matter to B, only that it is the same certificate as the one that B previously received during the key exchange ceremony.

Out-of-band certificate exchange is commonly used today in the context of EDI systems.

Trusted Certificate Authority

In out-of-band certificate exchange, each party does its own due diligence to trust another party's certificate. Another model is to delegate that due diligence to a trusted third party.

For example, EPCglobal might offer a certificate signing service. Company A presents a certificate to EPCglobal, and that certificate contains a GLN number based on a company prefix previously assigned to Company A by GS1. EPCglobal makes sure that it is really Company A providing the certificate (this may be done by a face-to-face ceremony and contract similar to the out-of-band certificate exchange, and then signs Company A's certificate using EPCglobal's private key pair. EPCglobal also publishes its public key.

Sometime later, Company B wishes to authenticate a party claiming to be Company A. Company B first uses an authentication protocol to verify the possession of Company A's certificate. Then it examines the certificate and notes that it was signed by EPCglobal (it can verify this using EPCglobal's public key). Because Company B trusts that EPCglobal will follow its certificate signing policy, it knows that the certificate in question was verified by EPCglobal to really belong to Company A, as identified by its GLN. Therefore, B can trust the authentication as really verifying Company A.

Note that the mere fact that EPCglobal signed Company A's certificate is not what confers trust; it is the due diligence policy that EPCglobal follows before it signs, and the fact that B knows and trusts this policy.

Delegated Trust

In some situations, one party may confer trust on another party. For example, Party A sends to Party B a message that says "Party C is entitled to X", accompanied by C's certificate. Assuming Party B trusts Party A to only send such a message when Party C is in fact so entitled, then a party that later contacts Party B and is authenticated to hold C's certificate can be inferred to be entitled to X. As in the out-of-band exchange scenario, the content of the certificate doesn't matter, only that it is the same certificate as received earlier from A.

Challenges in Multi-Party Scenarios

Consider now a three-step supply chain consisting of Manufacturers, Distributors, and Retailers. A Manufacturer sells product to a Distributor, and a Distributor sells product to a Retailer. Manufacturers and Retailers do not have any direct business relationship with each other in this example.

As before, the Manufacturer would like complete visibility of the fate of a particular product having EPC X. But unlike the two-party scenario, the Manufacturer cannot identify all the sources of data through pre-arrangement: some of the data comes from the particular Retailer to whom the Distributor sold product X, but the Manufacturer has no way of knowing which of the many Retailers that is. The Manufacturer may not even be aware of the total universe of Retailers, as he has no direct business relationship with any of them.

To illustrate the subtleties of this problem, some solutions are considered that ultimately are not adequate to meet business requirements.

Inadequate Solution #1: Push Data along the Chain

In this solution, EPCIS data is passed between companies along the same pathways as the product itself.

1. As the product moves from M to D to R, EPCIS events are recorded in the databases owned by M, D, and R, respectively.
2. D queries R for data related to EPC X, to which R responds.
3. M queries D for data related to EPC X, and D responds with data in its own database, as well as data received from R in Step 2.

In this solution, the Discovery problem has been reduced to be the same as the two-party example: the Manufacturer knows it can get all the data it needs from the Distributor, who is the party with whom it has a business relationship and to whom it knows it delivered product X. The Authentication, Trust, and Entitlement issues are likewise the same as in the two-party example. There are, however, several significant drawbacks to this solution:

The Distributor carries a burden to gather data from the Retailers, and make it available to Manufacturers. If the data is only of value to the Manufacturer, this may be a burden the Distributor is unwilling to shoulder.

The Retailer loses any ability to control Manufacturers' access to its data.

Inadequate Solution #2: Open Central Index

In this solution, a central index is maintained by an independent organization. As goods move through the supply chain, each supply chain party makes an entry in the central index to indicate that it has data about that EPC. Later, a party can query the index to find all the organizations that have data about a specific EPC. The central index plays a role similar to an Internet search engine.

1. As the product moves from M to D to R, EPCIS events are recorded in the databases owned by M, D, and R, respectively. Also, at each step, M, D, and R send a "has data" message to the central index, C, to indicate that it has data about a specific EPC.
2. M queries the central index to find out who has data about EPC X. The Index C responds with the list of all participants who previous sent "has data" messages about EPC X, namely, the list {M, D, R}.
3. M queries D to get its data.
4. M queries R to get its data. M now has all information about EPC X.

Compared to Solution #1, this solution has several advantages:

Data stays with the data owner until some other party wants it

No party has to act as a data forwarder. That is, no party is required to hold data that it is not interested in.

Each party can make an entitlement decision for each party requesting data.

Does not rely on data following a complete chain. If one party fails to transfer data or make index entries, the other index entries are still valid and useful.

However, there is a significant security problem with this scheme. The entitlement decision was made at the point data is requested (Steps 3 and 4). No entitlement decision is made by the central index C in responding to a request in Step 2—it cannot, because the index has no knowledge of the business relationships that might govern an entitlement decision. This means that anybody can find out where EPC data is located. This opens up the possibility for abuse. For example, another retailer R2 might want to learn how much product is sold by its rival R. It can learn this by making queries to the central index, iterating through all possible serial numbers for a given product. It will then learn for which of those serial numbers R has data, and therefore gets a good approximation to the volume that R is selling.

A second security issue is that in Step 4, R has no basis on which to make its entitlement decision in responding to M's request. How does it know that M has any legitimate business interest in EPC X? While R knows it received EPC X from D, it has no way of knowing that M originally delivered EPC X to D, because R and M have no business relationship. Though similar in effect to the previous paragraph, this is a second security problem that must be solved in addition to properly securing the discovery information.

Stepping Back: What's Wrong?

The above attempts to solve the data exchange problem for a multi-party supply chain illustrate the difficulty. In a multi-party supply chain:

Each party who wants data may not have a direct business relationship with each party who owns some of that data, even if the first party is entitled to receive the data.

It may not be feasible for data to traverse the same pathways as the products themselves or the business relationships—parties may want direct access to data held by others that are several steps removed on the supply chain. This leads to a desire to put "discovery information"—where data resides—someplace that is directly accessible, such as a centralized index.

But merely learning the identity of who has data about a specific EPC can reveal confidential information. Therefore, discovery information faces similar entitlement issues as the event data itself.

Short-circuiting business relationship pathways to retrieve data may lead to parties lacking enough information to make entitlement decisions.

In order to reconcile these observations, it will be necessary to augment "discovery information" with information about entitlement, and to allow this entitlement information to be passed along outside of business relationship pathways. We outline an approach to this in the next section.

Ingredients of General Solution

A general solution to the multi-party data exchange problem that fully addresses security issues requires a more complex set of interactions than the failed attempts above. For the sake of precision, these interactions will be described using a formalized set of data elements and queries as outlined below.

Formal Model

To model the interaction between parties, the following formal model is used:

A participant is a business entity, identified by a capital letter A, B, C, etc. Each participant has a certificate that can be used to authenticate its identity. Participants include the following:

A custodial participant is an entity that takes possession of a physical object.

A contractual participant is an entity that engages in business transactions with custodial participants, but who does not actually take possession of physical objects. An example is a freight forwarder who contracts with carriers to deliver goods, but who does not take possession of the goods.

A service participant is an entity that provides a data service to other participants, but does not otherwise take possession of physical objects or engage in business transactions. An example is a central indexing service operated by EPCglobal.

Of these different kinds of participants, only custodial participants generate new EPCIS events.

A physical object is something that is transferred from one custodial participant to another. Each physical object is presumed to be identified by an EPC, here identified by the letter X, Y, or Z.

A data element is an atomic unit of data that is exchanged between participants. The data elements are defined below.

A notification takes place when one participant delivers a data element to another participant, not in response to any request.

A request is a message sent from Participant A to Participant B, in response to which Participant B sends a response message to Participant A. A method is a particular kind of request and the expected response. The methods are defined below.

The following data elements are used:

Event (A, X, other data) This denotes an EPCIS event asserted by Participant A about EPC X. The EPCIS event contains information defined in the EPCIS specification, including the type of event (observation, aggregation, etc), the time, the location, the business context, and so on. This is all denoted by "other data" here.

HasData (A, X) This denotes an assertion by Participant A that it possesses event data pertaining to EPC X.

WillShare (A, X, B) This denotes an assertion by Participant A that it is willing to share data about EPC X with Participant B, without granting B any rights to share that data with others.

WillShareMany (A, X, B) This denotes an assertion by Participant A that it is willing to share data about EPC X with Participant B, and that B may share that data with other participants.

WillShareAll (A, X) This denotes an assertion by Participant A that it is willing to share data about EPC X with any other participant.

The following method are used:

A→B: WhoHasData (X) This is a query from Participant A to Participant B asking who has data about EPC X. The response B→A: {HasData(C1, X), HasData(C2, X), . . . } is a set of HasData assertions about EPC X. In responding to this query, Participant B will only include HasData assertions to which Participant A is entitled to receive.

A→B: GetEvents(X, tokens) This is a query from Participant A to Participant B asking for EPCIS events pertaining to EPC X. The response B→A: {Event(C1, X, data), Event(C2, X, data), . . . } is a set of EPCIS events pertaining to EPC X. The events may be ones generated by B or by other participants if B is forwarding information received from others. In responding to this query, Participant B will only include EPCIS assertions to which Participant A is entitled to receive. To make this entitlement decision, Participant B may make use of the entitlement "tokens" that are included in the request. Exactly what these "tokens" are is defined below.

The following notation is used to indicate interactions between participants:

A: dataelement indicates that Participant A has created a new data element.

A→B: dataelement indicates that Participant A has sent a notification to Participant B containing the data element A→B: request indicates that Participant A has sent a method request to Participant B. This is followed by . . . .

B→A: response indicates that Participant B has sent a response to Participant A.

At any time, the set of data elements possessed by Participant A are the data elements it has created, the data elements it has received in notifications from other participants, and the data elements it has received in response from other participants.

When security is fully considered, it will be necessary to use digital signatures to establish authenticity and trust. Superscript notation is used to indicate that a message has been digitally signed by a participant. For example:

A→B: HasData(A, X)$^A$ indicates that the message HasData(A, X) has been digitally signed by A.

C→B: WillShare(A, X, B)$^{A, B}$ indicates that the message WillShare(A, X, B) has been digitally signed by both A and B.

Example: Modeling the Two-Party Example

To illustrate the notation, here is an illustration of the Two-Party example.

Participants:
M=Manufacturer
R=Retailer
1. M: Event(M, X, data1) (one or more as EPC X moves through M's facilities)
2. R: Event(R, X, data2)

3. M→R: GetEvents(X) In considering this request, R decides that M is entitled to the "data2" event because M has a valid supplier relationship and previously shipped EPC X to R.
4. R→M: {Event(R, X, data2)}

At the conclusion of this sequence, the set of events possessed by M is Event(M, X, data1) and Event(R, X, data2).

Example: Modeling Inadequate Solution #1 to the 3-Party Problem

Here is how another scenario modeled:
Participants:
M=Manufacturer
D=Distributor
R=Retailer
1. As the product moves from M to D to R, we have:
    1.1 M: Event(M, X, data1)
    1.2 D: Event(D, X, data2)
    1.3 R: Event(R, X, data3)
2. D→R: GetEvents(X) R decides D is entitled to all events it has about EPC X, owing to their business relationship and the fact that R received EPC X from D
    2.1 R→D: {Event(R, X, data3)}
3. M→D: GetEvents(X) D decides M is entitled to all events it has about EPC X, owing to their business relationship and the fact that D received EPC X from M. Following Step 2.1, this data includes both the data3 event and the data2 event
    3.1 D→M: {Event(R, X, data3), Event(D, X, data2)}
M now has all three events.

Modeling Inadequate Solution #2
Here is how yet another scenario is modeled:
Participants:
M=Manufacturer
D=Distributor
R=Retailer
C=Central Index
1. As the product moves from M to D to R, we have:
    1.1 M: Event(M, X, data1)
        M→C: HasData(M, X)
    1.2 D: Event(D, X, data2)
        D→C: HasData(D, X)
    1.3 R: Event(R, X, data3)
        R→C: HasData(R, X)
2. M→C: WhoHasData(X)
    2.1 C→M: {HasData(M, X), HasData(D, X), HasData(R, X)}

As pointed out above, this response is problematic, because C has not considered entitlement at all in revealing this discovery information. The index C has simply responded to anybody who asks with all information about who has data about X.

3. M→D: GetEvents(X)
    3.1 D→M: Event(D, X, data2)
4. M→R: GetEvents(X) As pointed out above, R has no basis on which to make the entitlement decision, as R has no business relationship with M. But to complete the example, we assume R decides to share the data it has.
    4.1 R→M: Event(M, X, data3)

At this point, M now has all three relevant events. As noted above, however, this use case does not really succeed, as there was no way to actually make the entitlement decision in Step 4.

Adding Entitlement to Discovery

To address the security issues, two new ingredients are added to the solution framework. First, a set of data elements are introduced that allow entitlement decisions to be delegated to other participants. These are the WillShare elements above. Second, the GetEvents request is extended so that entitlement information can be communicated.

Here is the 3-party example again, but this time with proper security.
Participants:
M=Manufacturer
D=Distributor
R=Retailer
C=Central Index
1. As the product moves from M to D to R, we have:
    1.1 M: Event(M, X, data1)
        M→C: HasData(M, X)
    1.2 At the point where M ships X to D, both M and D tell the central index C that they are willing to share data about X with each other. This willingness is governed by the business contract between M and D. These data elements are digitally signed so that C can forward them
        M→C: WillShareMany(M, X, D)$^M$
        D→C: WillShareMany(D, X, M)$^D$
    1.3 D: Event(D, X, data2)
        D→C: HasData(D, X)
    1.4 At the point where D ships X to R, both D and R tell the central index C that they are willing to share data about X with each other. As before, this willingness is governed by the business contract between D and R.
        D→C: WillShareMany(D, X, R)$^D$
        R→C: WillShareMany(R, X, D)$^R$
    1.5 R: Event(R, X, data3)
        R→C: HasData(R, X)
2. M→C: WhoHasData(X)
    2.1 C→M: {HasData(M, X), HasData(D, X), HasData(R, X), WillShareMany(D, X, M)$^D$, WillShareMany(R, X, D)$^R$}

Unlike before, C now has entitlement information it can use to decide whether to provide this discovery information to M. Because of the previous assertion WillShareMany(D, X, M), C can decide to reveal HasData(D, X)—D has previously asserted that it is willing to share data about X with M. Likewise, the previous assertions WillShareMany(R, X, D) and WillShareMany(D, X, M) taken together tell C that it can reveal HasData(R, X) to M.

In addition to the discovery information, C includes in its response the signed WillShareMany assertions that led it to reveal the HasData elements. Later, M will use these to prove to R that it is entitled to the actual data.

3. M→D: GetEvents(X)
    3.1 D→M: Event(D, X, data2)
4. M→R: GetEvents(X, {WillShareMany(D, X, M)$^D$, WillShareMany(R, X, D)$^R$})

This is a similar request to Step 4 above, with the addition of security "tokens," namely the signed WillShareMany elements that M received from C in Step 2.1. As described below, these enable R to make an entitlement decision, and share its data with M.
    4.1 R→M: Event(M, X, data3)

The security tokens provided in Step 4 are used in two ways. First, the WillShareMany(D, X, M) assertion tells R that it is OK to share data about X with M, provided that R is willing to share data with D. This is the information required for the entitlement decision. (R's willingness to share data with D is established by the other assertion WillShareMany(R, X, D) provided by M, though M really didn't need to provide this to R since it was R's assertion in the first place.)

Second, the security tokens let R establish trust with M. R has no business relationship with M, and so when R receives M's request it has no basis on which to trust the result of authenticating M. But because M trusts D (they do have a business relationship), and D signed the WillShareMany(D, X, M) assertion, authenticating that the M that sent the request is the same M that is named in the assertion is sufficient trust for the purpose of this particular request. This is an example of delegated trust.

This example provides the first solution to the 3-party data exchange problem in which security is fully addressed. The central index C will only reveal discovery information (Has-Data assertions) about EPC X to those participants that have a legitimate business interest in EPC X, as evidenced by the WillShare assertions that were created and signed under the governance of valid business relationships. In fact, the central index will selectively reveal to a given participant just those HasData assertions for which a chain of business relationships is established, and no others. Thus, for a given EPC the index may have HasData assertions from many participants, but different subsets of these assertions are revealed to different participants depending on their respective rights to know.

Likewise, each GetEvents request is accompanied by sufficient information so that a receiver can make a proper entitlement decision, such that data is only shared with other participants that have a legitimate right to receive data about EPC X. Appropriate trust can be established, even if the sender of the GetEvents request has no business relationship or prior contact with the receiver. Moreover, because the entitlement decision is based on assertions that are signed by the parties that have governing business relationships, the receiver of the GetEvents request can later prove that it had the right to share the data with the requester. This provides a form of non-repudiation.

Variations on the 3-Party Example

Here we consider some variations on the 3-party example that serve to reduce or simplify the message traffic.

Trusted Central Index

In a section above, the heart of the entitlement decisions was the chaining together of WillShareMany assertions to establish an overall entitlement relationship. This happened twice: first, the central index C did this in Step 2 in order to determine what discovery information to return; second, the retailer R did this in Step 4 using the security tokens provided by the manufacturer M. Besides repeating this computation, this required a lot of WillShareMany data elements to be returned from the central index C in Step 2, and provided again in Step 4. If this were a 4-party, 5-party, or longer supply chain, the amount of entitlement data would be even larger.

This can be reduced if participants place more trust in the central index C. In Step 2.1, C generates and signs a new WillShare assertion that distills the result of chaining the original WillShareMany assertions:

2.1 C→M: {HasData(M, X), HasData(D, X), HasData(R, X), WillShare(R, X, M)$^C$}

In Step 4, M provides this assertion to R:

4. M→R: GetEvents(X, {WillShare(R, X, M)$^C$}

R now directly has the entitlement information it needs. This only works, however, if R trusts C: it has to have established trust with C in order to accept the assertion signed by C, and it also must trust that C will only generate a WillShare assertion if it truly is in possession of underlying WillShare/WillShareMany assertions provided by other participants. Note that if R ever challenges C on this point, C can produce evidence in its favor in the form of the original WillShareMany assertions.

Reducing Interaction with the Central Index

In the 3-party example, the main beneficiaries of the central index service are the manufacturers and retailers, who otherwise would not be able to find each other. The index avoids requiring the distributor to relay data back and forth as in Inadequate Solution #1. The distributor, however, does not really benefit from the index, because it can find all the data it needs by following its existing business relationships. Therefore, the distributor may be unwilling to engage in any message exchanges with the central index, even if the distributor has no objection to manufacturers and retailers using the index to help locate data.

A way around this is to notice that in the section above each interaction between the distributor and the index took place in the context of a business transaction between the distributor and another participant. Because both parties to a business transaction understand what is happening, this means the distributor can delegate responsibility for communicating with the index to its trading partners. Here is the result:

1. As the product moves from M to D to R, we have:
   1.1 M: Event(M, X, data1)
   M→C: HasData(M, X)
   1.2 At the point where M ships X to D, M now takes full responsibility for interacting with the index. D still has to be involved with the WillShareMany message, as it needs to sign the assertion about what it is willing to share.
   M→C: WillShareMany(M, X, D)$^M$
   D→M: WillShareMany(D, X, M)$^D$
   M→C: WillShareMany(D, X, M)$^D$ The overall number of messages is not reduced (it is increased, in fact), but D no longer interacts with C at all.

1.3 D: Event(D, X, data2)
   D→C: HasData(D, X)
   1.4 At the point where D ships X to R, R takes responsibility for interacting with the index.
   D→R: WillShareMany(D, X, R)$^D$
   R→C: WillShareMany(D, X, R)$^D$
   R→C: WillShareMany(R, X, D)$^R$
   1.5 R: Event(R, X, data3)
   R→C: HasData(R, X)

The remainder of the example is the same as above.

This variation highlights the basic flexibility of the framework. By varying the assertions and data flow, it is possible to take different tradeoffs regarding the volume of message traffic and who bears this cost, level of security, and so on. The variations in the next section explore this further.

More Variations: the Flexibility of the Framework

The above section considered a 3-party scenario in which access to information was strictly controlled. But suppose that in some circumstances, participants are willing to be more open about their data.

The answer is yes, by using the WillShareAll assertion. The result looks like this:

1. As the product moves from M to D to R, we have the following. Each participant includes a WillShareAll assertion in its communication to C:
   1.1 M: Event(M, X, data1)
   M→C: HasData(M, X)
   M→C: WillShareAll(M, X)$^M$
   1.2 D: Event(D, X, data2)
   D→C: HasData(D, X)
   D→C: WillShareAll(D, X)$^D$
   1.3 R: Event(R, X, data3)
   R→C: HasData(R, X)
   R→C: WillShareAll(R, X)$^R$
2. M→C: WhoHasData(X)
   2.1. C→M: {HasData(M, X), HasData(D, X), HasData(R, X)} here C has a legitimate basis for revealing this discovery information, based on the previously received WillShareAll assertions.

3. M→D: GetEvents(X)
  3.1. D→M: Event(D, X, data2)
4. M→R: GetEvents(X)
  4.1. R→M: Event(M, X, data3)

The security tokens were not shown in this example, because they turn out to be unnecessary as R is willing to share data with everybody anyway. But either of the schemes discussed previously could apply here.

If a distributor actually wants to provide a data forwarding service, perhaps because there is no central index available or because the distributor can offer a more attractive option to its trading partners. By including WillShare assertions, R can regain control over its data that it gave up without the use of this permission.

As the product moves from M to D to R, we have:
4.2. M: Event(M, X, data1)
4.3. D: Event(D, X, data2)
4.4. R: Event(R, X, data3)
5. D→R: GetEvents(X) R decides D is entitled to all events it has about EPC X, owing to their business relationship and the fact that R received EPC X from D. By including a WillShareMany assertion, R grants D the right to share this data with others.
  5.1. R→D: {Event(R, X, data3), WillShareMany(R, X, D)$^R$}
6. M→D: GetEvents(X) D decides M is entitled to all events it has about EPC X, owing to their business relationship and the fact that D received EPC X from M. D now has a legitimate basis for including the data previously received from R, owing to the WillShareMany assertion that it received from R.
  6.1. D→M: {Event(R, X, data3), Event(D, X, data2)}

Compared to the earlier attempt, R now has control over its data, as it can choose whether to share data just with D, or to also grant the right for D to share with others. Moreover, if R ever challenges D about the data it shared with M, D can produce evidence that it had the right to do so.

In all of the examples discussed so far, WillShareMany assertions were used. A participant can exert finer control over how its data is distributed by using WillShare assertions. For example, R might share data with D, but only grant D the right to share with a trusted set of other parties. One can imagine variations on the WillShare assertion that identify recognized groups of participants as opposed to individuals.

Addendum: Formal Rule for Following WillShare Chains

At the heart of the examples above was the evaluation of entitlement decisions by following chains of WillShare assertions. There is in fact a simple, universal rule for this process, which is stated formally below.

Given that A possesses a set of WillShare, WillShareMany, and WillShareAll assertions, then A may infer WillShare($C_1$, X, $C_n$) if and only if among the assertions that A possesses there is a chain WillShareMany($C_1$, X, $C_2$), . . . , WillShareMany($C_{n-2}$, X, $C_{n-1}$), WillShare*($C_{n-1}$, X, $C_n$), where n≧2 and WillShare*($C_{n-1}$, X, $C_n$) stands for any of the assertions WillShare($C_{n-1}$, X, $C_n$), WillShareMany($C_{n-1}$, X, $C_n$), or WillShareAll($C_{n-1}$, X).

Furthermore, A may only communicate HasData(B, X) to C if it can infer WillShare(B, X, C) according to the above rule.

These rules apply equally to any kind of participant, end-user participants, service participants such as central indices, and others.

More Complex Scenarios

The 3-party supply chain example was sufficient to uncover the requirements for secure data exchange and to establish the framework for the solution. Here we turn to more complex scenarios, and show how they can be solved as well.

Participant Relationships

In more complex scenarios, it is useful to have a way to visualize the relationships between the participants. This section defines a notation for this purpose.

There are several kinds of relationships between participants, which are defined formally below.

Biz(A, X, B) means that A and B have a business relationship with each other, governed by some kind of contract, pertaining to EPC X. For example, if A delivers EPC X to B in fulfillment of a purchase order, then Biz(A, X, B) is true. This is an undirected relation: Biz(A, X, B) implies and is equivalent to Biz(B, X, A).

Cust(A, X, B) means that A has delivered custody of EPC X to B, under the governance of a business contract. The business contract does not have to be between A and B (examples of this will be described below), but Cust(A, X, B) is intended to exclude cases where A delivers to B by mistake, contrary to any existing business transaction. This is an directed relation: Cust(A, X, B) is not the same as Cust(B, X, A).

Sight(A, X) means that A has made an observation of X in facilities under its control.

In the 3-party examples discussed previously, the Biz and Cust relationships coincided: there was Biz(M, X, D) and Biz(D, X, R), and also Cust(M, X, D) and Cust(D, X, M). But this is not always the case. Consider the use of a common carrier like the postal service: while there is a business relationship between the sender and the carrier (the purchase of a postage stamp or airbill), but there is no business relationship between the carrier and the recipient even though there is a custody handoff between the carrier and the recipient. This is explored in more detail below.

Likewise, it is not always the case that the Cust and Sight relations coincide. In any change of custody Cust(A, X, B), it follows that both A and B are likely to have observed X (that is, both Sight(A, X) and Sight(B, X) are expected). But there are at least two circumstances in which observations may fall outside a change of custody. One is if there are participants who can observe EPCs without actually having custody. For example, an airport security checkpoint makes and reports observations of EPC RFID tags: here are there are observations, but the airport does not have legal custody. (Obviously there are privacy implications to this kind of observation, but we merely wish to point out the possibility without commenting on the desirability of such observations.) The other is in the case of a mis-delivery, as noted above.

These relationships can be illustrated for a given EPC X by means of a graph. Nodes in the graph represent participants. A solid edge (with no arrow) is drawn between A and B if Biz(A, X, B). A dashed edge (with arrow) is drawn from A to B if Cust(A, X, B). Finally, the Sight relations are shown as edges in the graph by time-ordering them and drawing a dot-dashed arrow between each pair of adjacent Sightings. Because in most cases these will coincide with Cust edges, dot-dashed arrows will only be drawn when there is not a corresponding Cust edge.

Example: Common Carrier

Consider a sender S who sends a package X to recipient R using common carrier CC. The business relationships are:
Biz(S, X, CC), because S has purchased a postage stamp or an airbill from the carrier It is probable that Biz(S, X, R), assuming that S is not sending the package wholly unsolicited.

But there is no business relationship between CC and R, at least as it pertains to this particular package.

Figure 8:
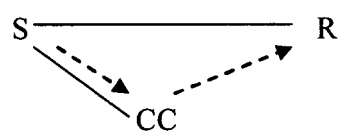
FIGS. 8 and 9 illustrate examples of one embodiment.

The chain of custody, of course, is Cust(S, X, CC) followed by Cust(CC, X, R). FIG. 8 illustrates this example.

Common carriers sometimes are willing to share visibility data publicly, for example the web-based tracking services offered by FedEx and UPS. But for the sake of discussion, assume that in this example the common carrier C only wants to share data with parties who have a legitimate interest in the package X.

Here is a plausible scenario, using the formal model from above, and presuming there is a central index service C.

1. S tells the index C that it has data about X and that it is willing to share data about X with R.
   S→C: HasData(S, X)
   S→C: WillShare(S, X, R)$^S$
2. CC picks up the package from S. As part of the delivery contract, CC agrees that it will share data with S and whoever S wants to share with:
   CC→C: HasData(CC, X)
   CC→C: WillShareMany(CC, X, S)$^{CC}$
3. S sends an Advance Shipping Notice (ASN) to R, so that R knows the EPC of the package, X.
4. R can now track his package by querying the central index:
   R→C: WhoHasData(X)
   C→R: {HasData(S, X), HasData(CC, X), WillShareMany(CC, X, S)$^{CC}$, WillShare(S, X, R)$^S$}
5. The WillShare assertions that R has obtained from C are sufficient so that CC will respond to R with the data it seeks.

This example illustrates how the business relationships have been used to provide entitlement, even though the business relationships do not coincide with the chain of custody.

Example: Trans-Oceanic Logistics

Here is a very complex example, involving the following parties:

S is a shipper, who wants to ship goods from China to the US.

R is the receiver on the other continent who will receive the goods.

FF is a freight forwarder, whom S contracts to handle the overall delivery. FF never takes custody of the goods, but instead subcontracts out to a consolidator in China, an ocean carrier, and a de-consolidator in the US.

CO is a consolidator that operates out of the Chinese port. CO takes goods from many shippers in China and consolidates them into containers for an ocean-going vessel.

V is the ocean carrier that owns and sails the vessel.

DE is a de-consolidator that operates out of the US port. DE unloads ocean freight and delivers them by land to their final destination.

CLC is a Chinese land carrier that CO subcontracts with to carry the goods from the shipper S to the Chinese port ULC is a US land carrier that DE subcontracts with to carry the goods from the US port to the receiver R.

Figure 9:
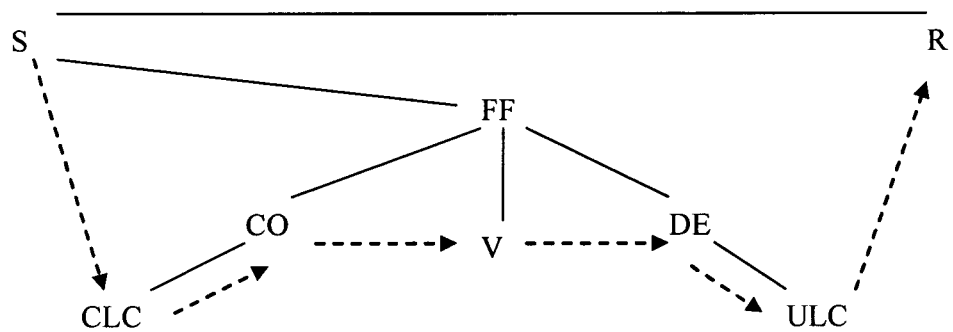

Putting this together in diagram form gives the example of FIG. 9.

Ultimately, both S and R would like to have visibility over the entire process. Let us consider two scenarios. In the first scenario, the freight forwarder FF agrees to give S and R direct visibility to all data, using a central index approach. The relevant messages are:

1. When the contract between S and FF is consummated, FF tells the index it will share data with S. S also tells the index it will share data with R:
   FF→C: WillShareMany(FF, X, S)$^{FF}$
   S→C: WillShare (S, X, R)$^S$
2. When FF contracts with CO, V, and DE, FF requires as a term of those contracts that these parties will share data with FF and allow FF to share that data with whomever FF wishes:
   CO→C: WillShareMany(CO, X, FF)$^{CO}$
   V→C: WillShareMany(V, X, FF)$^V$
   DE→C: WillShareMany(DE, X, FF)$^{DE}$
3 Likewise, CO and DE have a similar agreement with their local carriers:
   CLC→C: WillShareMany(CLC, X, CO)$^{CLC}$
   ULC→C: WillShareMany(ULC, X, DE)$^{ULC}$
4. If S or R queries the central index for data about X, there are enough WillShareMany assertions that all parties' data can be accessed (the details are an exercise for the reader).

For providing visibility to S and R. The scenario is almost exactly the same as before, except that FF does not issue the WillShareMany(FF, X, S) assertion. Without this assertion, the central index will not reveal any visibility information to S, and because R's entitlement is based on what data S has, the index will not reveal information to R either. This again shows the flexibility of the framework and its ability to accommodate a variety of business requirements regarding security and confidentiality of data.

Classification of Data Exchange Solutions

As the foregoing has shown, data exchange problems, their shape as reflected by business and custody relationships, and the consequent business requirements vary widely from scenario to scenario. Therefore, it is not reasonable to expect that all data exchange problems will be solved in exactly the same way.

For this reason, this paper has focused on creating a framework which can be adapted to different business requirements. Specifically, this paper proposes a vocabulary of data elements and methods that can be used in different combinations to achieve different effects in terms of data sharing and entitlement. Moreover, these ingredients can be deployed by different combinations of participants, including purely peer-to-peer arrangements, systems involving a central index, and various intermediate points in between.

In light of this, it is helpful to introduce some way of classifying data exchange solutions, so that different business problems can be ranked in terms of the complexity required by their solution. This is similar to the way RFID Tags are classified by capability, where Class 0 refers to read-only passive identity tags, Class 1 refers to passive read-write identity tags, Class 2 refers to passive tags with more advanced features, etc. We propose to introduce a classification system for data exchange solutions, defined in terms of what features from the framework are employed. In this way, business problems can be ranked: for example, Business Problem X requires a Class 2 data exchange infrastructure, whereas Business Problem Y only requires a Class 1 data exchange infrastructure.

In one embodiment, we can define Class 1 as involving only peer-to-peer interaction (no central indices) and no entitlement messages, Class 2 as including entitlement messages, Class 3 requiring central indices, etc.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A system comprising:
    a first product code data provider that stores a set of data identified by a product code, wherein the first product code data provider transmits index information and permission information, wherein the index information associates the product code with the identity of the first product code data provider and wherein the permission information entitles accessing the index information to a second product code data provider and wherein the permission information further delegates an entitlement decision to the second product code data provider such that the second product code data provider is entitled to share the index information of the first product code data provider with a third product code data provider; and
    a central data repository that stores the index information and the permission information received from the first product code data provider;
    wherein, upon receiving a request from the third product code data provider, the central data repository provides the index information to the third product code data provider if and only if there exists a valid chain of said permission information that entitles accessing the index information to the third product code data provider.

2. The system of claim 1, wherein the permission information indicates that the first product code data provider shares the index information with all third parties.

3. The system of claim 1, wherein the permission information indicates that the first product code data provider shares the index information only with one or more specifically identified third parties.

4. The system of claim 1, wherein the permission information indicates that the first product code data provider shares the index information only with one or more specifically identified third parties and with parties designated by the one or more specifically identified third parties.

5. The system of claim 1, wherein index information is a tuple associating the product code to the identity of the first product code data provider for said electronic product code.

6. The system of claim 1, wherein the request for index information specifies the product code whose associated index information is to be retrieved.

7. The system of claim 1, wherein the central data repository authenticates the identity of the second product code data provider making the request.

8. The system of claim 1, wherein a response from the central data repository contains a subset of previously received index information, the subset being determined according to previously received permission information.

9. The system of claim 8, wherein the index information is included in the response only if a previously received permission indicates that index information may be shared with all third parties.

10. The system of claim 8, wherein the index information is included in the response only if a previously received permission indicates that index information may be shared with a specific third party, the specific third party being the same as the third party making the request.

11. The system of claim 8, wherein index information is included in the response only if a previously received permission indicates that index information may be shared with a specific third party and those the third party designates, and there is a chain of permissions that connects the specific third party to the third party making the request.

12. The system of claim 8, wherein the response includes all previously received permission information that was used to authorize the inclusion of the index information in the response.

13. The system of claim 12, wherein the permission information is digitally signed by the first product code data provider and the digital signatures are included with the permission information in a response from the central data repository to the second product code data provider.

14. The system of claim 1, wherein the permission information received from the first product code data provider is digitally signed by the first product code data provider.

15. A method comprising:
receiving index information and permission information from a first product code data provider to a central data repository, wherein the first product code data provider stores a set of data identified by a product code, and wherein the index information associates the product code with the identity of the first product code data provider and wherein the permission information entitles accessing the index information to a second product code data provider and wherein the permission information further delegates entitlement decision to the second product code data provider such that the second product code data provider is entitled to share the index information of the first product code data provider with a third product code data provider;
storing the index information and the permission information received from the first product code data provider on said central data repository;
receiving a request for the index information from the third product code data provider to the central data repository;
providing, by the central data repository, the index information to the third product code data provider if and only if there exists a valid chain of said permission information that entitles accessing the index information to the third product code data provider.

16. A computer-readable storage medium storing one or more sequences of instructions, said instructions, when executed by one or more processors, causing the one or more processors to perform the steps of:
receiving index information and permission information from a first product code data provider to a central data repository, wherein the first product code data provider stores a set of data identified by a product code, and wherein the index information associates the product code with the identity of the first product code data provider and wherein the permission information entitles accessing the index information to a second product code data provider and wherein the permission information further delegates entitlement decision to the second product code data provider such that the second product code data provider is entitled to share the index information of the first product code data provider with a third product code data provider
storing the index information and the permission information received from the first product code data provider on said central data repository;
receiving a request for the index information from the third product code data provider to the central data repository;
providing, by the central data repository, the index information to the third product code data provider if and only if there exists a valid chain of said permission information that entitles accessing the index information to the third product code data provider.

* * * * *

UNITED STATES PATENT AND TRADEMARK OFFICE
CERTIFICATE OF CORRECTION

PATENT NO. : 8,527,539 B2  
APPLICATION NO. : 12/018685  
DATED : September 3, 2013  
INVENTOR(S) : Traub et al.

Page 1 of 1

It is certified that error appears in the above-identified patent and that said Letters Patent is hereby corrected as shown below:

On Title page, column 2, under Abstract, line 3, delete "produce" and insert -- product --, therefor.

In the Drawings

On sheet 6 of 8, in figure 6, reference numeral 622, line 1, delete "permisssion" and insert -- permission --, therefor.

On sheet 6 of 8, in figure 6, reference numeral 624, line 1, delete "permisssion" and insert -- permission --, therefor.

In the Specifications

In column 7, line 42, delete "Some time" and insert -- Sometime --, therefor.

In column 8, line 18, delete "rules?Three" and insert -- rules? Three --, therefor.

In column 14, line 36, delete "dataelement" and insert -- dataElement --, therefor.

In column 14, line 38, delete "dataelement" and insert -- dataElement --, therefor.

In column 22, line 13, delete "3 Likewise" and insert -- 3. Likewise --, therefor.

In the Claims

In column 26, line 23, in Claim 16, delete "provider" and insert -- provider; --, therefor.

Signed and Sealed this  
Twenty-fourth Day of December, 2013

Margaret A. Focarino  
*Commissioner for Patents of the United States Patent and Trademark Office*